United States Patent
Teranishi et al.

(10) Patent No.: US 6,854,783 B2
(45) Date of Patent: Feb. 15, 2005

(54) MULTI-LAYER INSTRUMENT PANEL HAVING AN ACCESSORY MOUNTED THEREON AND A METHOD OF MANUFACTURING THE SAME

(75) Inventors: Sadao Teranishi, Aichi (JP); Kazuo Hirayama, Aichi (JP); Satoru Nitta, Aichi (JP); Masaaki Kobashi, Aichi (JP); Mano Osamu, Aichi (JP); Junji Yokoyama, Aichi (JP)

(73) Assignee: Mitsubishi Belting Ltd., Kobe (JP)

( * ) Notice: Subject to any disclaimer, the term of this patent is extended or adjusted under 35 U.S.C. 154(b) by 0 days.

(21) Appl. No.: 09/795,642

(22) Filed: Feb. 28, 2001

(65) Prior Publication Data

US 2001/0030070 A1 Oct. 18, 2001

(51) Int. Cl.⁷ .............................................. B62D 25/14
(52) U.S. Cl. .................................... 296/70; 296/37.12
(58) Field of Search .......................... 296/70–72, 189, 296/37.12, 900, 901; 280/752

(56) References Cited

U.S. PATENT DOCUMENTS

| | | | | |
|---|---|---|---|---|
| 4,109,955 A | * | 8/1978 | Amann et al. ............. | 296/37.1 |
| 4,309,012 A | * | 1/1982 | Fukunaga ................. | 296/37.12 |
| 4,530,517 A | * | 7/1985 | Miyabayashi et al. ...... | 280/752 |
| 4,568,404 A | * | 2/1986 | Herring ................. | 296/70 |
| 4,759,568 A | * | 7/1988 | Paefgen et al. ........... | 280/752 |
| 4,805,924 A | * | 2/1989 | Birchfield et al. .......... | 280/752 |
| 4,892,770 A | * | 1/1990 | Labrie ..................... | 428/71 |
| 5,020,845 A | * | 6/1991 | Falcoff et al. ............. | 296/37.7 |
| 5,190,314 A | * | 3/1993 | Takasugi .................. | 280/752 |
| 5,544,912 A | * | 8/1996 | Sommer .................. | 280/728.3 |
| 5,658,652 A | * | 8/1997 | Sellergren ................. | 296/70 |
| 5,817,408 A | * | 10/1998 | Orimo et al. .............. | 296/39.3 |
| 5,890,755 A | * | 4/1999 | Speelman et al. ........ | 296/37.12 |
| 5,976,289 A | * | 11/1999 | Kawakubo et al. .......... | 296/70 |
| 6,071,591 A | * | 6/2000 | Dausch .................... | 428/132 |
| 6,199,942 B1 | * | 3/2001 | Carroll, III et al. ......... | 296/189 |
| 6,203,092 B1 | * | 3/2001 | Yoshinaka ................ | 296/70 |
| 6,217,098 B1 | * | 4/2001 | O'Brien et al. ............ | 296/70 |
| 6,250,669 B1 | * | 6/2001 | Ohmiya .................. | 280/732 |

* cited by examiner

Primary Examiner—Stephen T. Gordon
Assistant Examiner—Greg Blankenship
(74) Attorney, Agent, or Firm—Wood, Phillips, Katz, Clark & Mortimer

(57) ABSTRACT

The combination of a multi-layer instrument panel having a skin layer with an exposed surface and an opening therethrough and a first accessory that is mounted in the opening. The first accessory has an exposed surface that is substantially flush with the exposed surface of the skin layer with the first accessory mounted in the opening and operatively connected to the multi-layer instrument panel. The invention is also directed to a method of manufacturing the instrument panel with the first accessory.

47 Claims, 4 Drawing Sheets

MULTI-LAYER INSTRUMENT PANEL HAVING AN ACCESSORY MOUNTED THEREON AND A METHOD OF MANUFACTURING THE SAME

BACKGROUND OF THE INVENTION

1. Field of the Invention

This invention relates to instrument panels of the type used on automobiles and, more particularly, to instrument panels having at least one accessory mounted in an opening on the instrument panel. The invention is also directed to a method of manufacturing this type of instrument panel.

2. Background Art

In FIG. 9, conventional instrument panel is shown at 10, with an opening 12 therethrough for receiving accessories 14, such as vents, and the like. The accessory 14 shown is operatively connected to the instrument panel 10 in what is conventionally termed a "flush" mount arrangement. The characterization "flush" is actually inaccurate, as explained below.

The instrument panel 10 has a multi-layer construction. A synthetic material defines the innermost core layer 16, and has laminated thereto a cushion layer 18. A skin layer 20 is in turn laminated to the cushion layer 18.

In a "flush" mount design of the type shown, it is preferred that an exposed, forwardly facing surface 22 on the accessory 14 be flush with a forwardly facing surface 24 on the skin layer 20. Ideally, there is no visible step at the transition between the surfaces 22,24.

Conventionally, the accessory mounting is rejected in the event that the forward surface 22 on the accessory 14 projects forwardly beyond the forward surface 24 on the skin layer 20. In the interest of minimizing the number of rejected mountings, it has been conventional to recess the accessory surface 22 behind the skin surface 24 by an amount indicated by "T". Typically, the dimension "T" is on the order of 2 to 3 mm.

In the conventional instrument panel 10, the accessories 14 are operatively connected utilizing a spring-holding element 26, which is attached to a frame 28 on the accessory 14. Because of the multi-layer design of the instrument panel 10, variations in the thickness thereof between the contact location 30 for the holding element 26 and the skin surface 24 may be significant. To safely accommodate anticipated variations in thickness, and to assure that the accessory surface 22 does not project forwardly beyond the skin surface 24, the recessed dimension "T" has been generally selected in the aforementioned range of 2 to 3 mm. While this approach has avoided the outward projection of the accessory 14, flushness at the juncture between the surfaces 22,24 of the accessory 14 and skin layer 20 has been compromised. The extent of recess of the accessory 14 may also vary from one process to the next. In any event, the desired flush relationship between the surfaces 22,24 of the accessory 14 and skin layer 20 would not be realized. As a result, the appearance of the instrument panel 10, with the accessory 14 operatively connected thereto, may not be as good as desired.

Aside from the aesthetic problems described above, the mounting system in FIG. 9 can also complicate maintenance. Because of the use of the holding element 26 on the relatively rigid frame 28, separation of the accessory 14 from the instrument panel 10 may be difficult.

SUMMARY OF THE INVENTION

In one form, the invention is directed to the combination of a multi-layer instrument panel having a skin layer with an exposed surface and an opening therethrough and a first accessory that is mounted in the opening. The first accessory has an exposed surface that is substantially flush with the exposed surface of the skin layer with the first accessory mounted in the opening and operatively connected to the multi-layer instrument panel.

The multi-layer instrument panel may consist of a core layer of synthetic resin and a cushion layer laminated to the core layer. The skin layer may be laminated to the cushion layer.

In one form, the first accessory is secured directly to the skin layer on the multi-layer instrument panel.

The cushion layer may be a foamed resin.

In one form, the first accessory has a first securing part and there is a second securing part defined at least partially by the skin layer. The first and second securing parts are connected to maintain the first accessory operatively connected to the multi-layer instrument panel.

In one form, the first securing part has a first shoulder, the second securing part has a second shoulder, and the first and second shoulders face each other, with the first accessory operatively connected to the multi-layer instrument panel, to maintain the first accessory operatively connected to the multi-layer instrument panel.

In one form, there is a projection on one of the first and second securing parts and a receptacle for the projection on the other of the first and second securing parts. The projection defines one of the first and second shoulders. The other of the first and second shoulders bounds the receptacle.

In one form, the exposed surface of the skin layer faces in a first direction, there is a second surface defined by the skin layer that is spaced from the exposed surface of the skin layer and faces in the first direction, and the first accessory has a surface that is abutted to the second surface with the first accessory operatively connected to the multi-layer instrument panel.

The combination may further include a fastener connect between the multi-layer instrument panel and the first accessory to maintain the first accessory operatively connected to the multi-layer instrument panel.

The fastener may connect between the core layer and the first accessory.

In one form, the fastener has a gripping portion which is releasably engageable with the multi-layer instrument panel and first accessory in a plurality of different relative positions.

The receptacle and projection may have a complementary shape. In one form, the receptacle and projection have a squared shape.

The combination may further include a shape retaining member embedded in the multi-layer instrument panel to rigidify the multi-layer instrument panel adjacent to where the first and second securing parts are connected.

The shape retaining member may be embedded in the cushion layer or attached to the skin layer. The shape retaining member may be bonded to the skin layer.

In one form, the projection has a pawl-like configuration.

In one form, the receptacle is formed in the cushion layer.

In one form, the multi-layer instrument panel has a peripheral edge extending around the opening therein and the receptacle is defined on the peripheral edge.

In one form, the fastener is elongate with a length and has a plurality of projections and recesses alternating along the length of the fastener.

The fastener may be fixedly maintained on the first accessory so as to move as one piece with the first accessory.

In one form, the fastener engages the core layer to maintain the first accessory operatively connected to the multi-layer instrument panel.

In one form, the core layer has a free edge and the fastener engages the free edge of the core layer.

The core layer may have an opening therethrough. In one form, the fastener extends into the opening in the core layer.

In one form, the projection extends into the opening in the multi-layer instrument panel.

In one form, the exposed surface of the skin layer faces in a first direction, the multi-layer instrument panel defines a second surface within the opening, spaced from the exposed surface and facing in the first direction, and there is a projection next to the opening adjacent to the second surface.

In one form, the multi-layer instrument panel is formed by pouring a resin material and solidifying the resin material with the projection in the receptacle.

The resin material may define the cushion layer.

In one form, the exposed surface of the skin layer has a radius of curvature at the opening not more than 1.0 mm.

In one form, the exposed surfaces on the accessory and multi-layer instrument panel face in the same direction and are spaced from each other by no more than 1.0 mm.

The first accessory may have a frame with a notch therein to promote flexing of the frame to facilitate assembly and disassembly thereof.

The invention is also directed to the combination of a multi-layer instrument panel having a skin layer with an exposed surface and an opening, and a first accessory that is mounted in the opening. The exposed surface faces in a first direction. The skin layer defines a second surface that is spaced from the exposed surface of the skin layer and faces one of a) in the first direction and b) oppositely to the first direction. The first accessory is directly abuttable to the second surface with the first accessory operatively connected to the multi-layer instrument panel.

In one form, the first accessory has a first securing part and the multi-layer instrument panel has a second securing part, including the second surface, and the first and second securing parts are connected to maintain the first accessory operatively connected to the multi-layer instrument panel.

In one form, there is a projection on the multi-layer instrument panel defining the second surface.

In one form, there is a receptacle on the multi-layer instrument panel defining the second surface.

In one form, there is a projection on one of the first and second securing parts and a receptacle for the projection on the other of the first and second securing parts. The projection resides in the receptacle with the first accessory operatively connected to the multi-layer instrument panel.

The invention is also directed to the combination of a multi-layer instrument panel having a skin layer with an exposed forward surface and an opening, and a first accessory that is mounted on the opening. The first accessory has a first securing part and the multi-layer instrument panel has a second securing part. The projection is provided on one of the first and second securing parts with the receptacle being on the other of the first and second securing parts. The receptacle and projection have shapes that are closely complementary so as to abut and substantially limit both fore and aft movement of the first accessory within the opening with the first accessory operatively connected to the multi-layer instrument panel.

In one form, the receptacle and projection have a squared shape.

The invention is also directed to a method of manufacturing a multi-layer instrument panel with a first accessory. The method includes the step of: directing the first accessory into an opening in the multi-layer instrument panel so that a securing part on the multi-layer instrument panel is in connected relationship to a securing part on the first accessory; with the first accessory in the opening, pouring a flowable material so as to define a part of the multi-layer instrument panel; and solidifying the flowable material.

The flowable material may be a foamed resin.

The method may include the step of placing the multi-layer instrument panel in a mold prior to pouring the flowable material.

The multi-layer instrument panel may be formed by laminating a core layer, a cushion layer, and a skin layer.

The core layer may be a synthetic resin material.

In one form, the first accessory has a forwardly facing surface, the multi-layer instrument panel has a skin layer and an exposed, forwardly facing surface, and the forwardly facing surfaces are substantially flush with each other.

In one form, the forwardly facing surface of the skin layer has a radius of curvature at the opening in the multi-layer instrument panel that is no greater than 1.50 mm.

In one form, the forwardly facing surfaces are spaced by no more than 1.5 mm and, more preferably, no more than 1.0 mm.

DETAILED DESCRIPTION OF THE DRAWINGS

Figure 1:
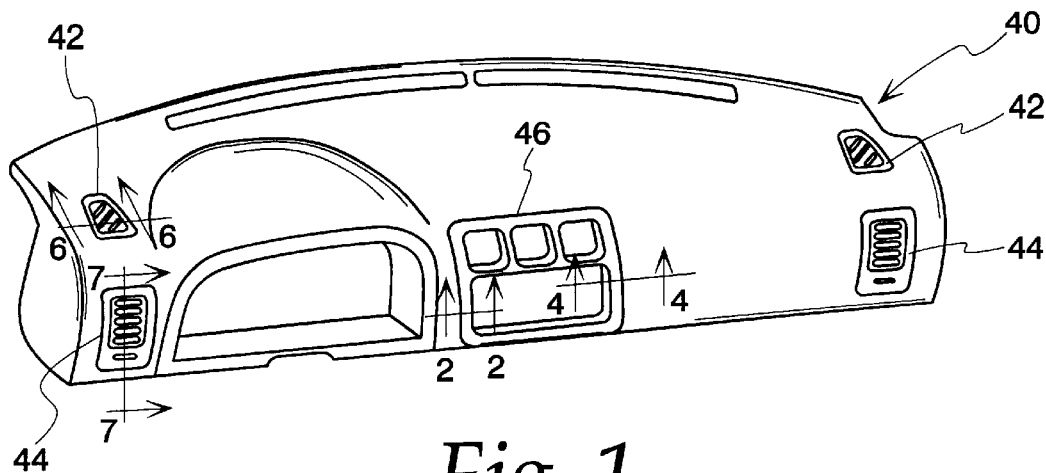
FIG. 1 is a perspective view of a multi-layer instrument panel having a plurality of accessories mounted in openings therein, according to the present invention.

In FIG. 1, a multi-layer instrument panel, according to the present invention, is shown at 40. The instrument panel is designed to be conventionally mounted in the front windshield of an automobile, and supports various accessories, in this case side vents 42,44 and a center vent 46. These accessories are just exemplary of that which can be mounted to the instrument panel 40 according to the invention.

Initially, the connection between the center vent 46 and the instrument panel 40 will be described, with reference to FIG. 2. The instrument panel 40 consists of a synthetic resin core layer 48 at the back side thereof. A cushion layer 50, which is a foamed resin, is laminated to the front side 52 of the core layer 48. A skin layer 54 is laminated to the cushion layer 50. An opening 56 is formed through the instrument panel 40 and has a peripheral edge 57 which defines a receptacle for the center vent 46.

The instrument panel 40 has a securing part 58 which cooperates with a securing part 60 on the center vent 46. The securing parts 58,60 are connected to maintain the center vent 46 operatively connected to the instrument panel 40.

In this embodiment, the securing part 60 is configured as a projection, with the securing part 58 configured as a receptacle for the projection 60. In this embodiment, the projection 60 and receptacle 58 have a closely complementary, squared shape. With the vent 46 operatively connected to the instrument panel 40, front and rear shoulders 64,66, bounding the receptacle 58, respectively face front and rear shoulders 67, 68 on the projection 60 to limit fore-and-aft movement of the center vent 46 relative to the instrument panel 40.

In this embodiment, the projection 60 is formed as one piece with a frame 70 on the side vent 44. The receptacle 58 is bounded by the skin layer 54, which extends continuously from the front of the instrument panel 40, at which it defines an exposed, front surface 72, into the opening 56 and in a U shape therewithin so as to bound the receptacle 58.

One or more notches 74 are formed partially through the frame 70 in the vicinity of the projection 60, to permit slight flexing of the projection 60. While the notch 74 is shown at the front of the projection 60, a like notch could be formed through the frame 70 at the rear of the projection 60 together with, or in place of the notch 74 at the front of the projection 60. The notch 74 promotes flexing of the frame 70 near the projection 60 to facilitate assembly and disassembly of the center vent 46.

By reason of connecting the projection 60 directly to the skin layer 54 within the receptacle 58, accurate fore-and-aft positioning of the center vent 46 is facilitated. In the absence of this arrangement, the center vent 46 is prone to being shifted either in a fore or aft direction by reason of dimensional variations in the thickness of the instrument panel components, principally the cushion layer 50, and also the core layer 48. This facilitates consistent positioning of a forwardly facing surface 76 on the center vent 46 in substantially flush relationship with the exposed front surface 72 on the skin layer 54 around the opening 56.

It is preferred that the radius R of curvature of the front surface 72 at the edge of the opening 56 be no more than 1.5 mm, and more preferably no more than 1.0 mm, so that the flush appearance of the center vent 46 can be maintained. Any step T1 between the surfaces 72,76 is preferably no greater than 1.5 mm and, more preferably, no greater than 1.0 mm.

Suitable materials for the core layer 48 include resins such as polypropylene, acrylonitrile-butadiene-styrene copolymer, acrylonitrile-styrene copolymer, denatured polyphenyleneoxide, and styrene maleic an hydride copolymer. Preferably, an olefin-based thermoplastic elastomer (hereinafter referred to as "TPO") is used. It is also preferable to use a TPO prepared by blending a polypropylene resin and ethylene-propylene rubber in a ratio of 1:1. As a result, it is possible to achieve a glass transition point for the TPO within a range of −50 to −60° C.

The foamed resin cushion layer 50 may be made from foaming agents which foam by adding a foaming agent to vinyl chloride, a TPO, a styrene-based thermoplastic elastomer, a urethane-based thermoplastic elastomer, and a polyester-based thermoplastic elastomer.

The skin layer 54 may be vinyl chloride resin, a synthetic resin of vinyl chloride and acrylonitrile-butadiene-styrene copolymer, and a TPO. The skin layer 54 may be formed into a sheet by vacuum forming or slush forming processes.

It is desirable to use a TPO material for all of the three layers 48,50,54. Unification of all these materials may improve recycling properties.

The frame 70 of the center vent 46 may be made from resins such as polypropylene, acrylonitrile-butadiene-styrene copolymer, acrylonitrile-styrene copolymer, a denatured polyphenyleneoxide, and a styrene maleic anhydride copolymer. Preferably, an olefin-based thermoplastic elastomer is used.

Figure 2:
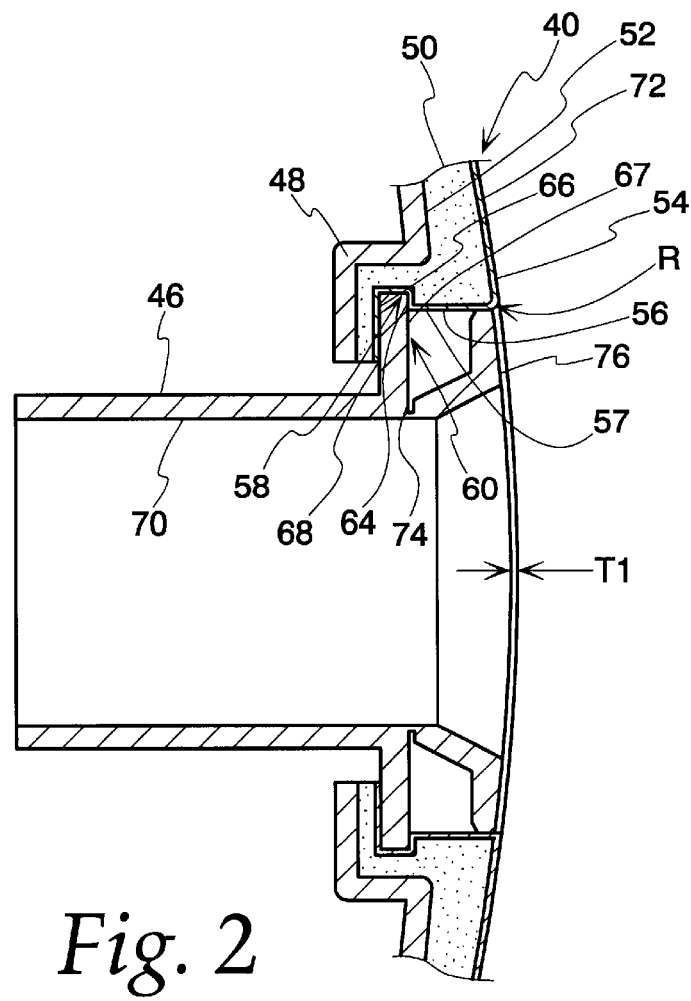
FIG. 2 is an enlarged, cross-sectional view of a connection between an accessory and the multi-layer instrument panel, taken along line 2—2 of FIG. 1.

Another embodiment of the invention will now be described with respect to FIGS. 3 and 4, in which components, the same as those in FIGS. 1 and 2, are designated with like numbers.

The center vent 46 has an integrally formed securing part 78 in the form of a leg 80 with a V-shaped enlargement 82 defining a projection 84. The securing part 78 has a cantilevered, paw-like configuration. The leg 80 can be formed as one piece with the remainder of the center vent 46, or separately formed and attached thereto.

The securing part 78 cooperates with a securing part 86 on the instrument panel 40. The securing part 86 has a squared receptacle 88 for the projection 84.

The receptacle 88 is defined behind a squared projection 90 that is spaced rearwardly of the exposed, front surface 72 of the skin layer 54. The projection 90 and receptacle 88 are both defined by the skin layer 54 in the region of the cushion layer 50 at the peripheral edge bounding the opening 56. A T-shaped shape retaining member 92 is embedded in the cushion layer 50 to rigidify the instrument panel 40 at the region where the securing parts 78,86 interact.

With this arrangement, the enlargement 82 cams against the projection 90 as the center vent 46 is pressed into the instrument panel opening 56. With the center vent 46 operatively connected to the instrument panel 40, a shoulder 96 on the securing part 78 bears against a shoulder 98 on the projection 90 to prevent withdrawal of the center vent 46 from the opening 56. With the center vent 46 operatively connected to the instrument panel 40, the aforementioned spacing T1 between the skin layer front surface 72 and the exposed, front surface 100 of the center vent 46 can be maintained within the desired range, i.e. less than 1.5 mm and more preferably less than 1.0 mm.

Figure 4:
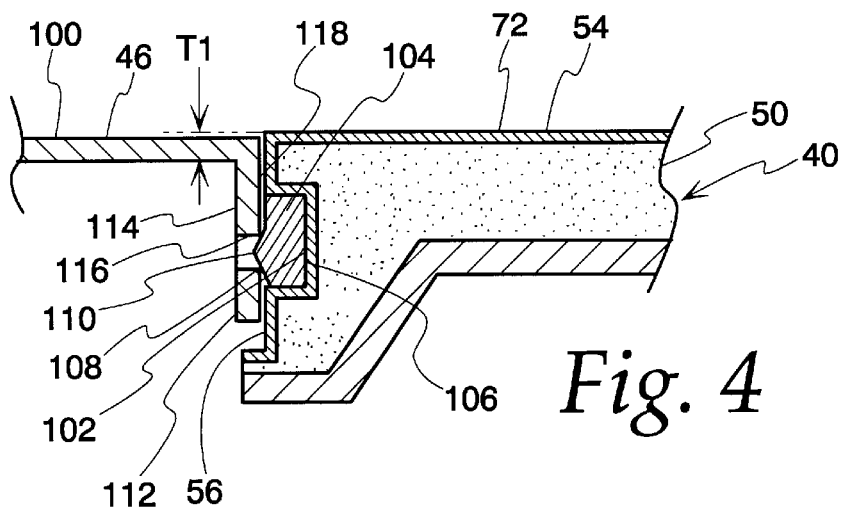
FIG. 4 is an enlarged, cross-sectional view of a connection between the accessory of FIG. 1 and the multi-layer instrument panel taken along line 4—4 of FIG. 1.

In FIG. 4, another connection between the side of the center vent 46 and the instrument panel 40 is described. In this embodiment, the skin layer 54 is formed over the cushion layer 50 so as to bound a squared receptacle 102 at the peripheral edge bounding the opening 56. A shape retaining member 104, having a shape complementary to the receptacle 102, is placed in the receptacle 102 and bonded thereto, as by an appropriate adhesive 106. The member 104 has a V-shaped enlargement 108 forming a projection which defines a securing part 110 to cooperate with a securing part 112 on the center vent 46.

More particularly, the securing part 112 is a straight arm 114 having a receptacle 116 for the enlargement 108 defined by an opening fully through the arm 114. With this arrangement, the enlargement 108 functions as a pawl, progressively camming against the surface 118 of the arm 114 as the center vent 46 is directed into the opening 56. Once the enlargement 108 and receptacle 116 coincide, the arm 114 springs back towards an undeformed state, wherein the V-shaped enlargement 108 nests in the receptacle 116. This relationship is achieved once the center vent 46 operatively connects to the instrument panel 40 with the spacing T1, between the front surface 100 of the center vent 46 and the front surface 72 of the skin layer 54, reduced to 1.5 mm or less, and more preferably to 1.0 mm or less.

It should be understood that a receptacle correspoding to the receptacle 116 could be formed in the instrument panel 40, within the opening 56, to receive a projection, corresponding to the projection 108. Multiple projections and cooperating receptacles could be provided on the center vent 46 and instrument panel 40 to cooprate in the manner shown. Spacing ribs (not shown) can also be utilized to prevent excessive penetration of the receptacle by the projections that might require an unnecessarily high removal force for the center vent 46.

One method of manufacturing the connection shown in FIGS. 3 and 4 will now be described. Referring initially to FIG. 3, the skin layer 54 is preformed in the opening 56 as shown. The shape retaining member 92 is pressed into a complementary space defined by the skin layer 54 at the projection 90. The shape retaining member 92 is temporarily bonded to the skin layer 54 using an adhesive 124. This avoids undesired shifting of the shape retaining member 92 relative to the skin layer 54 as the foamed resin of the cushion layer 50 is poured. The shape retaining member 92 is ultimately embedded in the solidified foamed resin in the cushion layer 50, which is shaped by an appropriate mold element, and the core layer 16, which cooperatively confine the resin. The thus-embedded shape retaining member 92 serves to rigidify the cushion layer 50 at the opening 56, which is desirable particularly under the pressing force that is imparted as the securing part 78 is cammed against the projection 90 during assembly of the center vent 46.

The connection shown in FIG. 4 may be similarly formed. That is, the skin layer 54 is preformed to the shape shown in the opening 94. The shape retaining member 104 is placed in the open receptacle 102, and bonded thereto using the adhesive 106. The thus formed skin layer 54 and the core layer 48 are then placed in a mold. The foamed resin defining the cushion layer 50 is then poured into the space between the skin layer 54 and core layer 48 and solidified. As in the prior embodiment, the shape retaining member 104 becomes firmly held in its desired position for accurate achievement of the desired position of the center vent 46, which is pressed into the opening 56.

Figure 3:
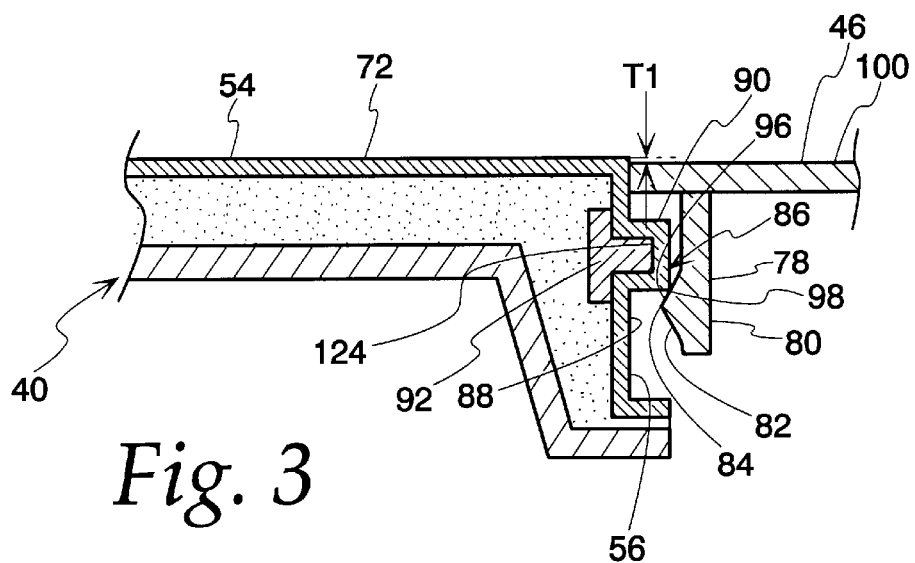
FIG. 3 is an enlarged, cross-sectional view of another form of connection between the accessory of FIG. 2 and the multi-layer instrument panel, taken along line 2—2 of FIG. 1.

In the embodiments shown in FIGS. 3 and 4, the connection between cooperating securing parts on the center vent 46 and instrument panel 40 can be consistently established and maintained. Positive interconnection of the securing parts allows the center vent 46 to be consistently mounted to maintain the dimension T1 in the preferred range to produce a flush appearance between the center vent 46 and the skin layer 54.

The placement of the center vent 46 into operative connection with the instrument panel 40 can be effected utilizing the elastic deformation of the material of the frame 126 that defines the center vent 46. The securing parts are designed to interact so as to hold the center vent 46 in place with the desired tenacity, yet to permit the center vent 46 to be withdrawn when repair and/or replacement is necessary. As seen in FIG. 3, the V-shaped configuration of the enlargement 82 produces a camming action both during assembly and disassembly. With the center vent 46 operatively connected, the enlargement 82 does not lock in a manner that would prevent withdrawal of the center vent 46.

Similarly, the V-shaped configuration of the enlargement 108 in FIG. 4 produces a camming action that both facilitates assembly and disassembly of the center vent 46. The penetration of the enlargement 108 is limited by the diameter of the receptacle 116 defined by the bore through the arm 114.

In both embodiments, the penetration of the center vent 46 within the opening 94 is controlled. A sufficient holding force can be generated without the need for a holding element 26, and shown in the prior art connection of FIG. 9.

The shape retaining members 92,104 may be made from at least one of polypropylene, acrylonitrile-butadiene-styrene copolymer, polycarbonate, a mixture of acrylonitrile-butadiene-styrene copolymer and polycarbonate, polyacetal, acrylonitrile-styrene copolymer, denatured polyphenyleneoxide, styrene maleic anhydride copolymer, noryl and nylon.

Variations in the configuration shown in FIGS. 3 and 4 are also contemplated. As just one example, the shape retaining member 104 may be adapted to be embedded in the cushion layer 50 to bear against the inside surface 128 of the skin layer 54 in FIG. 4, to perform as the shape retaining member 92 in FIG. 3. Similarly, the shape retaining member 92 in FIG. 3 could be placed in an open receptacle as is the shape retaining member 104 in FIG. 4 so that the securing part 78 bears directly thereagainst, rather than against the skin layer 54.

Figure 5:
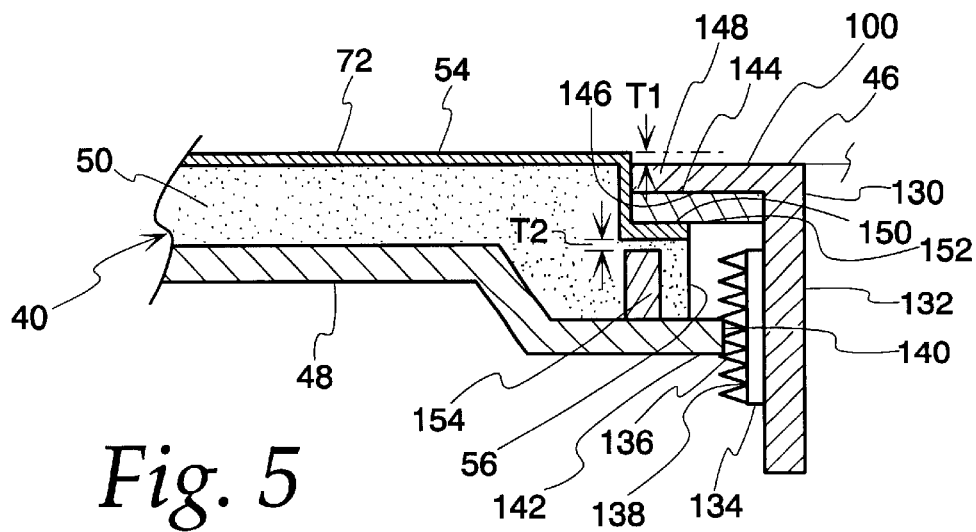
FIG. 5 is an enlarged, cross-sectional view of another form of connection between the accessory of FIG. 1 and the multi-layer instrument panel taken along line 4—4 of FIG. 1.
Figure 6:
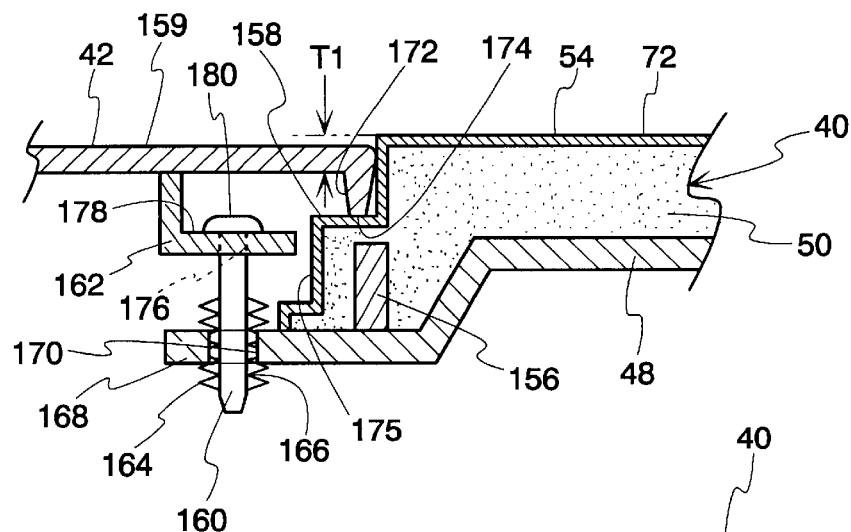
FIG. 6 is an enlarged, cross-sectional view of a connection between an accessory and the multi-layer instrument panel taken along line 6—6 of FIG. 1.

Additional embodiments of the invention are shown in FIGS. 5 and 6, in which corresponding elements shown in previously described figures are identified with like reference numerals. Referring initially to FIG. 5, an alternative connection is shown between the center vent 46 and the instrument panel 40. In this embodiment, the center vent 46 has a frame part 130 that has an inwardly projecting portion 132 with a fastener 134 thereon. The fastener 134 has a length extending in a fore-and-aft direction and ribs 136 and recesses 138 spaced at regular intervals alternatingly along the length of the fastener 134. The fastener 134 may be formed integrally with the portion 132 or separately formed and attached thereto as by an adhesive so as to move as one piece with the center vent 46.

The fastener 134 is designed to cooperate with a free end 140 on an extension 142 of the core layer 48 which projects beyond the cushion layer 50. This produces a ratchet-type arrangement which allows the fastener 134 to grippingly engage the free end 140 with the center vent 46 in a plurality of different fore-and-aft positions relative to the instrument panel 40.

In one form, the ribs 136 and recesses 138 have a pitch therebetween within a range of 0.5 to 2.0 mm so that a withdrawing force of from 50 to 200 N is required, with an attachment force of up to 100 N required. Accordingly, installation of the center vent 46 is facilitated, while at the same time the center vent 46 is precluded from being inadvertently repositioned. The center vent 46 is thus capable of being withdrawn in the event that repair and/or replacement become necessary.

A spacer 144 is provided at the inside surface 146 of a forward wall 148 on the center vent frame part 130. The spacer 144 is dimensioned to maintain the desired spacing T1, as previously described, between the forward surface 100 of the center vent 46 and the forward surface 72 of the skin layer 54. The spacer 144 bears against a forwardly facing surface 150 that is recessed rearwardly from the surface 72 and defined at a step 152 formed by the skin layer 54. With this arrangement, the forward surface 72 is placed at a consistent location by pressing the center vent 46, and the spacer 144 therebehind, against the surface 150.

For even better consistency of location of the center vent 46, the step 152 defining the surface 150 may be reinforced by a shape retaining member 154 embedded in the core layer 50 at a point adjacent to and immediately behind the step 152. With this arrangement, the thickness of the cushion layer 50 immediately behind the step 152 is effectively reduced to reduce the overall fore-and-aft deformability thereof. As a result, rearward pressure applied during the assembly of the center vent 46 can be withstood by the reduced thickness of the cushion layer 50 backed by the shape retaining member 154. Accordingly, consistent fore-and-aft location of the center vent 46 is facilitated. In one exemplary embodiment, the reduced thickness T2 of the cushion layer 50 between the step 152 and the shape retaining member 154 is within the range of 1 to 4 mm.

In FIG. 6, a connection is shown between the side vent 42 and the instrument panel 40. The skin layer 54 is formed in a stepped configuration. In this embodiment, the instrument panel 40 can be formed by pre-forming the skin layer 54 in the stepped arrangement against the core layer 48, and thereafter pouring and solidifying the foamed resin 50 in the space between the skin layer 54 and core layer 54. The shape retaining member 156 is embedded in the cushion layer 50 at a location behind a stepped portion 158 of the skin layer 54. Due to the reduced thickness of the cushion layer 50 between the core layer 48 and the skin layer 54, fore-and-aft deformation of the step portion 158 may be significantly limited, as a result of which consistent location of the side vent 42 can be effected. That is, the thickness T1 between a forwardly facing surface 159 of the vent 42 and the forwardly facing surface 72 of the skin layer 54 can be maintained within the desired range, i.e. no greater than 1.5 mm and preferably no more than 1.0 mm.

In FIG. 5, the center vent 46 is installed by pressing the same through the opening 56 of the instrument panel 40. The application of a rearward force on the center vent 46 causes the fastener 134 to move against the free end 140 of the core layer 48. Continued rearward application of force on the center vent 46 causes the center vent 46 and fastener 134 to shift rearwardly until the desired mentioned T1 is realized. Excessive rearward movement of the center vent 46 within the opening 94 is limited by the spacer 144.

In FIG. 6, a fastener 160 is utilized to maintain the side vent 42 in the desired fore-and-aft position relative to the instrument panel 40. In this embodiment, the fastener 160 is mounted on an L-shaped support 162 on the side vent 42. The support 162 may be formed as one piece with the remainder of the side vent 42 or separately attached thereto, as by an adhesive. The fastener 160 has an elongate shank with ribs 164 and recesses 166 provided alternatingly along the length of the fastener 160.

In this embodiment, the core layer 48 has an extension 168 and a bore 170 therethrough. The bore 170 is dimensioned so that the ribs 164 become compressed as the fastener 160 is pressed therethrough.

The side vent 42 has a rearwardly bent lip 172 with a rear edge 174 that engages the step portion 158 on the skin layer 54.

The instrument panel 40 can be formed in the same manner as described with respect to FIG. 5. That is, the skin layer 54 can be preformed at the peripheral edge bounding an opening 175. The skin layer 54 and core layer 48, with the shape retaining member 156 in place, can be placed in a mold. Foamed resin material can then poured and solidified in the space between the skin layer 54 and the core layer 48.

To effect assembly of the structure in FIG. 6, the fastener 160 is directed through a bore 176 in a leg 178 of the support 162 so that an enlarged head 180 is brought into abutment with the support 162. The side vent 42 is then pressed rearwardly to direct the fastener 160 into the bore 170. The core layer 48 grippingly engages the fastener 160 within the bore 170 through a range of adjustment. The side vent 42 is pushed slowly rearwardly until the desired aforementioned spacing T1 is established.

Preferably, the fastener ribs 164 and recesses 166 have the same construction as those on the fastener 134. That is, the ribs 164 and recesses 166 have a pitch in the range of 0.5 to 2.0 mm, with an attaching force of up to 100 N and a withdrawal force within a range of 50 to 200 N. This facilitates assembly, and accounts for a positive holding of the side vent 42 in the operative position. Fine fore-and-aft positioning adjustments can be made by the simple application of fore-and-aft forces on the side vent 42. At the same time, if repair and/or removal of the side vent 42 becomes necessary, this fastener construction makes removal of the side vent 42 possible.

Once the side vent 42 is installed, excessive rearward movement is limited by the cooperation between the edge 174 and the step portion 158 on the instrument panel 40.

Figure 7:
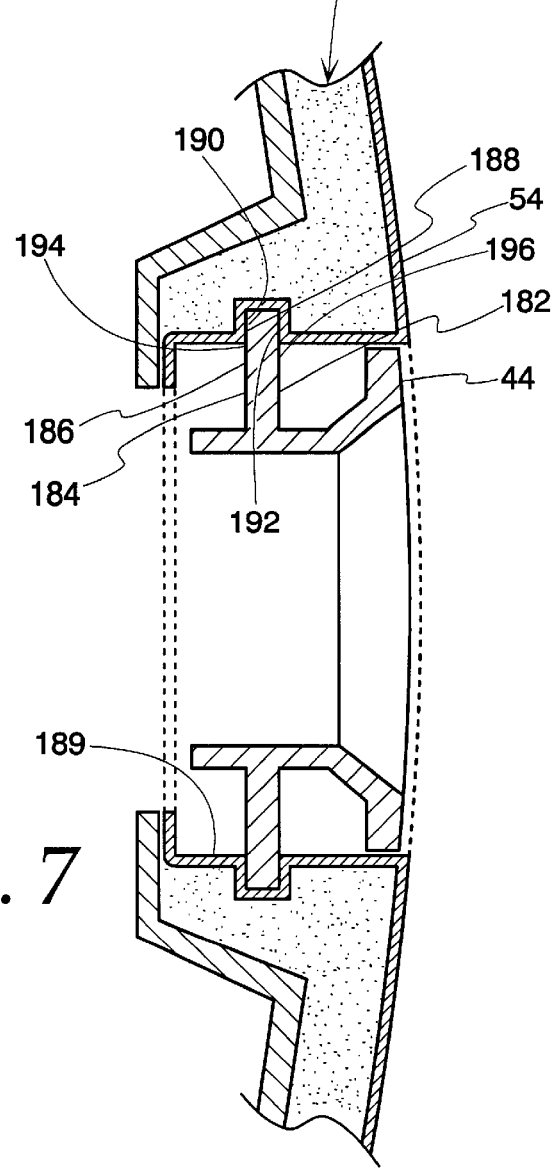
FIG. 7 is an enlarged, cross-sectional view of an accessory and the multi-layer instrument panel taken along line 7—7 of FIG. 1.
Figure 8:
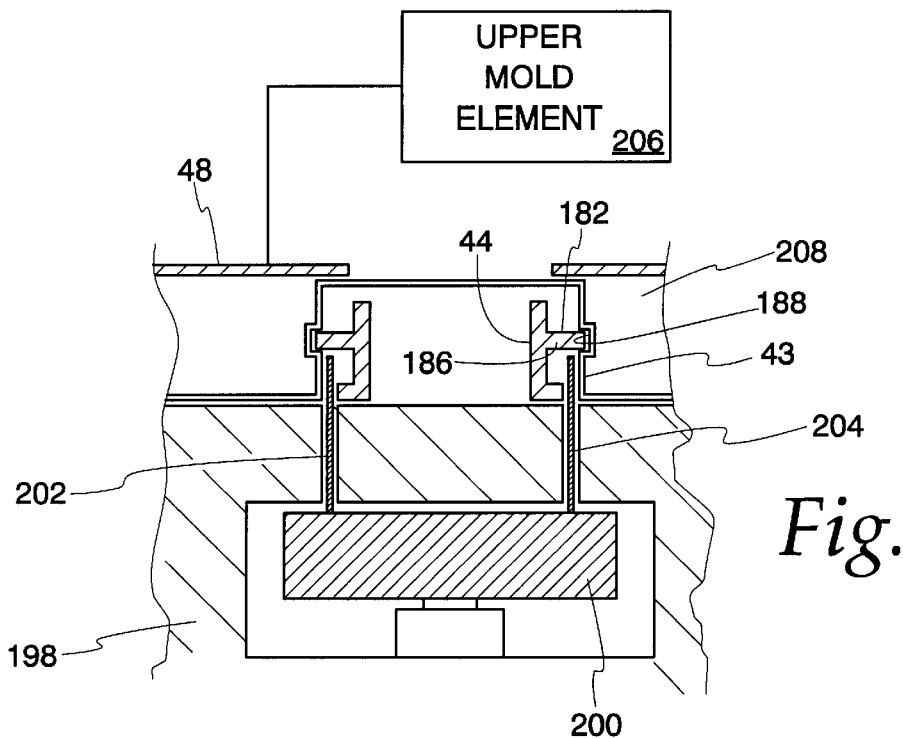
FIG. 8 is a cross-sectional view of an accessory and certain components of the multi-layer instrument panel before one of the layers is formed within a die assembly prior to pouring and curing one of the instrument panel layers.

Additional embodiments of the invention are shown in FIGS. 7 and 8. In FIGS. 7 and 8, the connection between the side vent 44 and instrument panel 40 is shown. The side vent 44 has a frame 182 with a securing part 184 in the form of a squared projection 186. The squared projection 186 fits within a closely complementarily-shaped receptacle 188 defined in the instrument panel 40 within an opening 189 in the instrument panel 40. The skin layer 54 bounds the receptacle 188. The skin layer 54 thus forms a securing part on the instrument panel 40 which is complementary to the securing part 184 on the frame 182.

More specifically, the receptacle 188 is bounded by forwardly and rearwardly facing shoulders 190,192 which closely confront rearwardly and forwardly facing shoulders 194,196 on the projection 186.

As shown in FIG. 8, the skin layer 43 is preformed to the configuration in FIG. 7, which will ultimately be maintained. The projection 186 on the frame 182 is directed into the receptacle 188. A mold assembly 198 is placed on the outside of the instrument panel components and has an associated die element 200 with sliding edges 202,204 to facilitate positioning of the skin layer 54. The core layer 48 is then placed in an upper mold element 206. Foam resin is then poured into the cavity 208 and solidified between mold parts.

The side vent 44 is maintained operatively connected to the instrument panel under the foaming force produced by the resin so that a squeezing action is produced between the securing parts on the side vent 44 and instrument panel 40. That is, the projection 186 becomes firmly grasped by the skin layer 43 bounding the receptacle 188. The need for fasteners and other holding structure may be obviated, potentially simplifying overall construction. Manufacturing may be simplified while maintaining low attendant costs. The sliding edges 202,204 are preferably withdrawn prior to the pouring of the foamed resin. This inhibits deformation from leakage that may occur during stripping of the molds.

The depth of penetration of the projection 186 determines the tenacity of the holding force between the projection 186 and the instrument panel 40.

Figure 9:
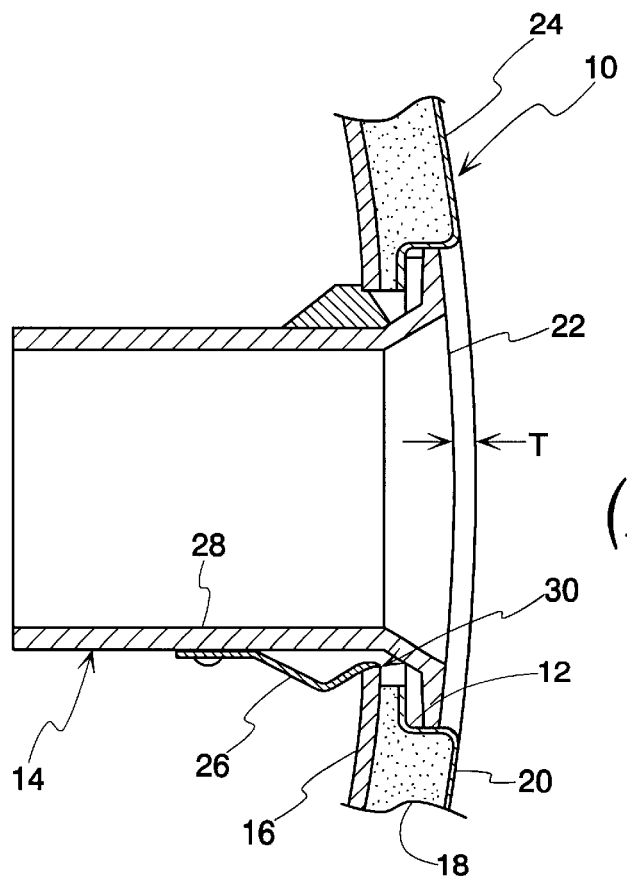
FIG. 9 is a fragmentary, cross-sectional view showing the connection between a conventional multi-layer instrument panel and an accessory mounted in an opening in the instrument panel.

With this arrangement, there is no requirement to use a separate holding element such as that shown at 26 in FIG. 9. This potentially reduces the number of parts required to effect assembly. This arrangement also facilitates the flush mounting of the side vent 44, as previously described.

In all embodiments, using the teachings above, one can design projections and receptacles, as well as other securing parts, that produce the desired holding force while permitting disassembly in the event of repair and/or replacement.

While the particular structures have been described with respect to side and center vents, the connections are interchangeably usable on all structures, as well as other accessories that may be mounted in an instrument panel opening.

The foregoing disclosure of specific embodiments is intended to be illustrative of the broad concepts comprehended by the invention.

What is claimed is:

1. In combination:
   a multi-layer instrument panel comprising a skin layer having an exposed surface, said multilayer instrument panel having an opening; and
   a first accessory separate from the multilayer instrument panel and mounted in the opening,
   wherein the first accessory has an exposed surface that is substantially flush with the exposed surface of the skin layer with the first accessory mounted in the opening and operatively connected to the multi-layer instrument panel.

2. The combination according to claim 1 wherein the multi-layer instrument panel comprises a core layer comprising a synthetic resin and a cushion layer laminated to the core layer, wherein the skin layer is laminated to the cushion layer.

3. In combination:
   a multi-layer instrument panel comprising a skin layer having an exposed surface, said multilayer instrument panel having an opening; and
   a first accessory mounted in the opening,
   wherein the first accessory has an exposed surface that is substantially flush with the exposed surface of the skin layer with the first accessory mounted in the opening and operatively connected to the multi-layer instrument panel,
   wherein the first accessory is secured directly to the skin layer on the multi-layer instrument panel.

4. The combination according to claim 2 wherein the cushion layer comprises a foamed resin.

5. In combination:
   a multi-layer instrument panel comprising a skin layer having an exposed surface, said multilayer instrument panel having an opening; and
   a first accessory mounted in the opening,
   wherein the first accessory has an exposed surface that is substantially flush with the exposed surface of the skin layer with the first accessory mounted in the opening and operatively connected to the multi-layer instrument panel,
   wherein the first accessory has a first securing part and there is a second securing part defined at least partially by the skin layer and the first and second securing parts are connected to maintain the first accessory operatively connected to the multi-layer instrument panel.

6. The combination according to claim 5 wherein the first securing part has a first shoulder, the second securing part has a second shoulder, and the first and second shoulders face each other with the first accessory operatively connected to the multi-layer instrument panel to maintain the first accessory operatively connected to the multi-layer instrument panel.

7. The combination according to claim 6 wherein there is a projection on one of the first and second securing parts and a receptacle for the projection on the other of the first and second securing parts, the projection defines one of the first and second shoulders and the other of the first and second shoulders bounds the receptacle.

8. In combination:
   a multi-layer instrument panel comprising a skin layer having an exposed surface, said multilayer instrument panel having an opening; and
   a first accessory mounted in the opening,
   wherein the first accessory has an exposed surface that is substantially flush with the exposed surface of the skin layer with the first accessory mounted in the opening and operatively connected to the multi-layer instrument panel,
   wherein the exposed surface of the skin layer faces in a first direction, there is a second surface defined by the skin layer that is spaced from the exposed surface of the skin layer and faces in the first direction, and the first accessory has a surface that is abutted to the second surface with the first accessory operatively connected to the multi-layer instrument panel.

9. The combination according to claim 8 further comprising a fastener connecting between the multi-layer instrument panel and the first accessory to maintain the first accessory operatively connected to the multi-layer instrument panel.

10. The combination according to claim 9 wherein the multi-layer instrument panel comprises a core layer and a cushion layer laminated to the core layer, wherein the skin layer is laminated to the cushion layer, and the fastener connects between the core layer and the first accessory.

11. In combination:
    a multi-layer instrument panel comprising a skin layer having an exposed surface, said multilayer instrument panel having an opening;
    a first accessory mounted in the opening,
    wherein the first accessory has an exposed surface that is substantially flush with the exposed surface of the skin layer with the first accessory mounted in the opening and operatively connected to the multi-layer instrument panel,
    wherein the exposed surface of the skin layer faces in a first direction, there is a second surface defined by the skin layer that is spaced from the exposed surface of the skin layer and faces in the first direction, and the first accessory has a surface that is abutted to the second surface with the first accessory operatively connected to the multi-layer instrument panel; and
    a fastener connecting between the multi-layer instrument panel and the first accessory to maintain the first accessory operatively connected to the multi-layer instrument panel, wherein the multi-layer instrument panel comprises a core layer and a cushion layer laminated to the core layer, wherein the skin layer is laminated to the cushion layer, and the fastener connects between the core layer and the first accessory, wherein the fastener has a gripping portion which is releasably engageable with the multi-layer instrument panel and first accessory in a plurality of different relative positions.

12. The combination according to claim 7 wherein the receptacle and projection have a complementary shape.

13. The combination according to claim 12 wherein the receptacle and projection each have a squared shape.

14. The combination according to claim 5 further comprising a shape retaining member embedded in the multi-layer instrument panel to rigidify the multi-layer instrument panel adjacent to where the first and second securing parts are connected.

15. The combination according to claim 14 wherein the multi-layer instrument panel comprises a core layer and a cushion layer laminated to the core layer, wherein the skin layer is laminated to the cushion layer and the shape retaining member is embedded in the cushion layer.

16. The combination according to claim 15 wherein the shape retaining member is attached to the skin layer.

17. The combination according to claim 16 wherein the shape retaining member is bonded to the skin layer.

18. The combination according to claim 7 wherein the projection has a pawl-like configuration.

19. The combination according to claim 7 wherein the multi-layer instrument panel comprises a core layer and a cushion layer laminated to the core layer, wherein the skin layer is laminated to the cushion layer and the receptacle is formed in the cushion layer.

20. The combination according to claim 7 wherein the multi-layer instrument panel has a peripheral edge extending around the opening and the receptacle is defined in the peripheral edge.

21. In combination:
a multi-layer instrument panel comprising a skin layer having an exposed surface, said multilayer instrument panel having an opening; and
a first accessory mounted in the opening,
wherein the first accessory has an exposed surface that is substantially flush with the exposed surface of the skin layer with the first accessory mounted in the opening and operatively connected to the multi-layer instrument panel,
wherein the exposed surface of the skin layer faces in a first direction, there is a second surface defined by the skin layer that is spaced from the exposed surface of the skin layer and faces in the first direction, and the first accessory has a surface that is abutted to the second surface with the first accessory operatively connected to the multi-layer instrument panel; and
a fastener connecting between the multi-layer instrument panel and the first accessory to maintain the first accessory operatively connected to the multi-layer instrument panel,
wherein the fastener is elongate with a length and comprises a plurality of projections and recesses alternating along the length of the fastener.

22. The combination according to claim 21 wherein the fastener is fixedly maintained on the first accessory so as to move as one piece with the first accessory.

23. The combination according to claim 21 wherein the multi-layer instrument panel comprises a core layer and a cushion layer laminated to the core layer, wherein the skin layer is laminated to the cushion layer and the fastener engages the core layer to maintain the first accessory operatively connected to the multi-layer instrument panel.

24. The combination according to claim 23 wherein the core layer has a free edge and the fastener engages the free edge of the core layer to maintain the first accessory operatively connected to the multi-layer instrument panel.

25. The combination according to claim 23 wherein the core layer has an opening therethrough and the fastener extends through the opening to maintain the first accessory operatively connected to the multi-layer instrument panel.

26. The combination according to claim 7 wherein the projection extends into the opening.

27. In combination:
a multi-layer instrument panel comprising a skin layer having an exposed surface, said multilayer instrument panel having an opening; and
a first accessory mounted in the opening,
wherein the first accessory has an exposed surface that is substantially flush with the exposed surface of the skin layer with the first accessory mounted in the opening and operatively connected to the multi-layer instrument panel,
wherein the exposed surface of the skin layer faces in a first direction, the multi-layer instrument panel defines a second surface within the opening spaced from the exposed surface and facing in the first direction and a projection in the opening adjacent to the second surface.

28. In combination:
a multi-layer instrument panel comprising a skin layer having an exposed surface, said multilayer instrument panel having an opening; and
a first accessory mounted in the opening,
wherein the first accessory has an exposed surface that is substantially flush with the exposed surface of the skin layer with the first accessory mounted in the opening and operatively connected to the multi-layer instrument panel,
wherein the first accessory has a first securing part and there is a second securing part defined at least partially by the skin layer and the first and second securing parts are connected to maintain the first accessory operatively connected to the multi-layer instrument panel,
wherein the first securing part has a first shoulder, the second securing part has a second shoulder, and the first and second shoulders face each other with the first accessory operatively connected to the multi-layer instrument panel to maintain the first accessory operatively connected to the multi-layer instrument panel,
wherein there is a projection on one of the first and second securing parts and a receptacle for the projection on the other of the first and second securing parts, the projection defines one of the first and second shoulders and the other of the first and second shoulders bounds the receptacle,
wherein the multi-layer instrument panel is formed by pouring a resin material and solidifying the resin material with the projection in the receptacle.

29. The combination according to claim 28 wherein the multi-layer instrument panel comprises a core layer and a cushion layer laminated to the core layer, wherein the skin layer is laminated to the cushion layer and the resin material defines the cushion layer.

30. In combination:
a multi-layer instrument panel comprising a skin layer having an exposed surface, said multilayer instrument panel having an opening; and
a first accessory mounted in the opening,
wherein the first accessory has an exposed surface that is substantially flush with the exposed surface of the skin layer with the first accessory mounted in the opening and operatively connected to the multi-layer instrument panel,
wherein the exposed surface of the skin layer has a radius of curvature not more than 1.0 mm at the opening.

31. The combination according to claim 1 wherein the exposed surfaces face in substantially the same direction and are spaced from each other by no more than 1.0 mm.

32. In combination:
a multi-layer instrument panel comprising a skin layer having an exposed surface, said multilayer instrument panel having an opening; and
a first accessory mounted in the opening,
wherein the first accessory has an exposed surface that is substantially flush with the exposed surface of the skin layer with the first accessory mounted in the opening and operatively connected to the multi-layer instrument panel,
wherein the first accessory has a frame with a notch therein to provide flexibility to the frame.

33. In combination:
a multi-layer instrument panel comprising a skin layer having an exposed surface, said multi-layer instrument panel having an opening; and
a first accessory mounted in the opening,
wherein the exposed surface faces in a first direction, the skin layer defines a second surface that is spaced from the exposed surface and faces one of a) in the first direction; and b) oppositely to the first direction, and the first accessory is directly abuttable to the second surface with the first accessory operatively connected to the multi-layer instrument panel.

34. The combination according to claim 33 wherein the first accessory has a first securing part and the multi-layer instrument panel has a second securing part comprising the second surface and the first and second securing parts are connected to maintain the first accessory operatively connected to the multi-layer instrument panel.

35. The combination according to claim 33 wherein there is a projection on the multi-layer instrument panel defining the second surface.

36. The combination according to claim 33 wherein there is a receptacle on the multi-layer instrument panel defining the second surface.

37. The combination according to claim 33 further comprising a fastener connecting between the multi-layer instrument panel and the first accessory to maintain the first accessory operatively connected to the multi-layer instrument panel.

38. The combination according to claim 37 wherein the multi-layer instrument panel comprises a core layer and a cushion layer laminated to the core layer, wherein the skin layer is laminated to the cushion layer and the fastener connects between the core layer and the first accessory.

39. In combination:
a multi-layer instrument panel comprising a skin layer having an exposed surface, said multi-layer instrument panel having an opening; and
a first accessory mounted in the opening,
wherein the exposed surface faces in a first direction, the skin layer defines a second surface that is spaced from the exposed surface and faces one of a) in the first direction; and b) oppositely to the first direction, and the first accessory is directly abuttable to the second surface with the first accessory operatively connected to the multi-layer instrument panel; and
a fastener connecting between the multi-layer instrument panel and the first accessory to maintain the first accessory operatively connected to the multi-layer instrument panel,
wherein the multi-layer instrument panel comprises a core layer and a cushion layer laminated to the core layer, wherein the skin layer is laminated to the cushion layer and the fastener connects between the core layer and the first accessory,
wherein the fastener has a gripping portion which is releasably engageable with the multi-layer instrument panel and first accessory in a plurality of different relative positions.

40. The combination according to claim 33 wherein the first accessory has a first securing part and there is a second securing part defined at least partially by the skin layer and the first and second securing parts are connected to maintain the first accessory operatively connected to the multi-layer instrument panel.

41. The combination according to claim 40 further comprising a shape retaining member embedded in the multi-layer instrument panel to rigidify the multi-layer instrument panel adjacent to where the first and second securing parts are connected.

42. The combination according to claim 41 wherein the multi-layer instrument panel comprises a core layer and a cushion layer laminated to the core layer, wherein the skin layer is laminated to the cushion layer and the shape retaining member is embedded in the cushion layer.

43. The combination according to claim 40 wherein there is a projection on one of the first and second securing parts and a receptacle for the projection on the other of the first and second securing parts, the projection residing in the receptacle with the first accessory operatively connected to the multi-layer instrument panel.

44. The combination according to claim 43 wherein the projection has a pawl-like configuration.

45. The combination according to claim 43 wherein the multi-layer instrument panel has a peripheral edge extending around the opening and the receptacle is defined on the peripheral edge.

46. In combination:
a multi-layer instrument panel comprising a skin layer having an exposed forward surface, said multi-layer instrument panel having an opening; and
a first accessory that is mounted in the opening,
wherein the first accessory has a first securing part and the multi-layer instrument panel has a second securing part, further wherein there is a projection on one of the first and second securing parts and a receptacle for the projection on the other of the first and second securing parts, the receptacle and projection having shapes that are closely complementary so as to abut to substantially limit both fore-and-aft movement of the first accessory within the opening with the first accessory operatively connected to the multi-layer instrument panel, the receptacle bounded by first and second surfaces that are substantially flat, oppositely facing, and substantially parallel to each other, the projection having substantially flat third and fourth surfaces which confront the first and second surfaces.

47. The combination according to claim 46 wherein the receptacle and projection have a squared shape.

* * * * *